No. 830,349. PATENTED SEPT. 4, 1906.
E. MEURER.
PULP SCREEN.
APPLICATION FILED MAR. 30, 1906.
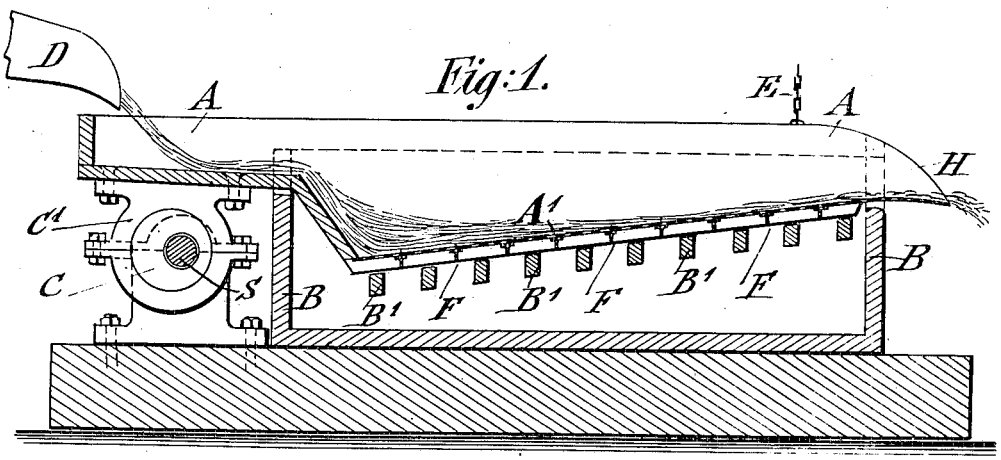
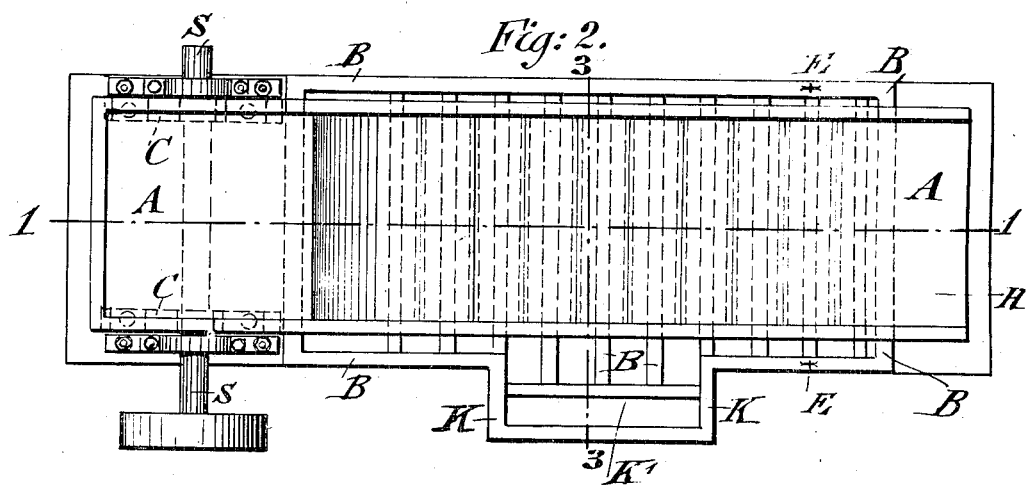
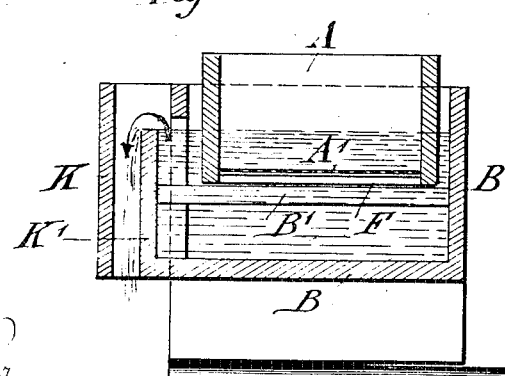

UNITED STATES PATENT OFFICE.

EUGENE MEURER, OF MUSKEGON, MICHIGAN.

PULP-SCREEN.

No. 830,349.  Specification of Letters Patent.  Patented Sept. 4, 1906.

Application filed March 30, 1906. Serial No. 308,882.

*To all whom it may concern:*

Be it known that I, EUGENE MEURER, a citizen of the Empire of Germany, residing in Muskegon, in the county of Muskegon and State of Michigan, have invented certain new and useful Improvements in Pulp-Screens, of which the following is a specification.

This invention relates to certain improvements in pulp-screens by which the knots and slivers are in a reliable manner separated from the fibers, the latter being passed through the slots of the screen and conducted off, the screen being submerged in the water during operation, so that the vacuum produced at the under side of the screen assists in separating the fibers from the knots and slivers; and the invention consists of a pulp-screen comprising a pulp-box, a screen with screen-plates and transverse bars below the same, means for reciprocating the screen, stationary cross-bars in said pulp-box, and a discharge-box provided with a partition for regulating the level of the liquid in the pulp-box; and the invention consists, further, of certain details of construction, which will be fully described hereinafter and finally pointed out in the claims.

In the accompanying drawings, Figure 1 represents a vertical longitudinal section of my improved pulp-screen on line 1 1, Fig. 2. Fig. 2 is a plan view of the same; and Fig. 3 is a vertical transverse section on line 3 3, Fig. 2.

Similar letters of reference indicate corresponding parts in the different figures of the drawings.

Referring to the drawings, A represents a screen which is composed of an oblong frame that is open at the outgoing end H and suspended near the outgoing end by chains or springs E. The screen A receives a rapidly-reciprocating motion from eccentrics C on a driving-shaft S, which is located below the ingoing end of the screen A, said screen being connected by straps C' with the screen, as shown in Fig. 1. The screen portion proper is preferably arranged at an angle of inclination, so as to be submerged in the liquid of a pulp-box B, which is somewhat wider than the screen, but of less length than the same, the end walls of the pulp-box B being recessed at their upper ends, so as to permit the reciprocation of the screen-frame in the same. The screen A is made in the usual manner, the screen-plates A' having fine slots, said plates being supported at the under side by means of cross-bars F, of T-shaped cross-section, which form pockets with the side walls of the frame of the screen, in which pockets a partial vacuum is produced below the screen when the latter is reciprocated. The water and pulp are supplied by the inlet D to the ingoing end of the screen, the pulp being screened while passing over the surface of the rapidly-reciprocating screen in such a manner that the knots and slivers pass over the screen and out at the discharge end H of the screen, while the fibers are drawn by suction through the slots in the screen-plates, so as to collect at the bottom of the box B, they being then delivered through a discharge-box K at one side of the same. By the reciprocating motion of the screen submerged in the water of the pulp-box a vacuum is formed under the screen, which is strongest at the end nearest the inlet D and which diminishes toward the outlet H and which assists in sucking the pulp fibers through the fine slots in the screen-plates. The pulp-box B is provided below the screen with cross-bars B', which, like the screen, are arranged at an inclination corresponding to that of the screen. The cross-bars B' are attached to the side walls of the pulp-box and serve for the purpose of giving a certain resistance to the water and pulp, so that the motion of the same is retarded and prevented from reciprocating at the same speed as the screen and the water and pulp above the same, whereby the suction action on the fibers below the screen is produced. The discharge-box K is provided with a partition K', the height of which regulates the level of the liquid in the box B, so that the water, with the separated fibers, can pass over the edge of the partition K' and out in the space between the same and the outer wall of the discharge-box K.

The advantages of the improved pulp-screen are that owing to the vacuum produced below the screen-plates and the reciprocation of the screen in submerged condition a suction action is exerted on the fibers, so as to force them through the slots in the screen. By the action of the vacuum below the screen even the longer fibers, which heretofore were liable to be run to waste with the knots and slivers, are drawn through the fine slots in the screen. As the screen is submerged, it is self-cleaning, requires no special attention, and furnishes a clean product.

Having thus described my invention, I claim as new and desire to secure by Letters Patent—

1. The combination of a pulp-box, a discharge-box for said pulp-box, a screen consisting of a screen-frame, slotted screen-plates, and transverse T-bars below said screen-plates, and means for reciprocating said screen in the pulp-box.

2. The combination of a pulp-box provided with transverse cross-bars arranged at a rising inclination from the ingoing toward the outgoing end of the pulp-box, a discharge-box for the pulp-box, a partition in said discharge-box, a screen arranged at an upward inclination above the cross-bars, and means for imparting reciprocating motion to the screen while submerged in the liquid in the pulp-box.

In testimony that I claim the foregoing as my invention I have signed my name in presence of two subscribing witnesses.

EUGENE MEURER.

Witnesses:
J. E. PETERSEN,
E. J. TOOLER.